United States Patent Office 3,684,615
Patented Aug. 15, 1972

3,684,615

METHOD OF FABRICATING A LAMINATED ID CARD BEARING CODED DATA TO BE READ BY A PHOTOELECTRIC INPUT DEVICE OF A DATA PROCESSOR

Roger J. Kuhns, Lincoln, Mass., assignor to Avant Incorporated, Lincoln, Mass.

No Drawing. Filed Apr. 2, 1969, Ser. No. 812,894
Int. Cl. C09j 5/06
U.S. Cl. 156—306 1 Claim

ABSTRACT OF THE DISCLOSURE

This disclosure is drawn to a method of fabricating a laminated ID card bearing coded indicia which may be read by a photoelectric pickup device, the process involving the marking of the coded indicia upon a data bearing sheet, preferably composed of olefin, and treating the data bearing sheet with a physical agent such as heat either before or preferably during lamination to render it substantially transparent in unmarked portions of the data bearing sheet.

BACKGROUND OF THE INVENTION

The present invention relates to the field of laminated ID cards.

It is becoming desirable that laminated ID cards bear coded information which is capable of being automatically read by a data processing machine. For example, it is desirable to utilize ID cards to open gates in various portions of a manufacturing facility which the bearer is authorized to enter. High security areas could be associated with one code and a lower security area could be identified with another code. Bearers of credit cards might have codes associated with their cards which represent various levels of credit to which they are entitled or their Social Security number to indicate the person to be charged. The repertory dialing of telephone numbers could be also effected by codes associated with plastic cards.

The standard approach of modifying plastic ID cards for machine reading involves key punching holes through all of the layers of the sandwich making up the ID card. One drawback of this approach involves the creepage of moisture into the core of the card to cause separation and deterioration of the inner data bearing sheet. Acid and greases also have been observed creeping into the core of the card because of the key punched holes, which, of course, disfigures the card and may obliterate data or images printed upon the inner data bearing sheet. Where pressure sensitive material is contained within the core of plastic ID cards, this tacky material has been known to ooze into the key punched holes to foul the operation of the electro-mechanical feelers utilized in conjunction with a data processor to read the codes. Additionally, key punched plastic cards are less flexible since flexure causes structural deterioration at the periphery of the key punched holes due to stress. Also, a punched hole method requires the use of costly and cumbersome machines to code punch holes, whereas my methods may utilize only simple writing instruments, e.g. pencils or pens.

It is thus desirable to utilize an inner data bearing sheet having coded indicia printed thereon that can be read by a photoelectric pickup device coupled to the input of a data processor. I have found that a thin transparent plastic core sheet is generally impractical for this purpose because it is difficult to write or print on the transparent plastic. On the other hand, ordinary paper is not practical because it is not highly light transmissive at portions surrounding the coded marks. Additionally, it is often desirable to emboss the inner data bearing core sheet with a seal or other indicia. Ordinary paper fibers readily fracture at the embossed portions beside having the aforementioned drawback of not being highly light transmissive. My methods lend themselves to manual coding, where desired, since pencils, ordinary pens, or brush pens may be utilized.

SUMMARY OF THE INVENTION

In accordance with a first method of the present invention, printed indicia including code marks are penciled, inked or printed upon a spun olefin or olefin fiber sheet. The olefin data bearing sheet is thereafter inserted within a light transmissive envelope which could consist of separate transparent sheets or a unitary folded sheet which forms two leaves which surround the inner data bearing olefin sheet. This combination is thereafter laminated to form a unitary ID card, the heat required to laminate the card causing the spun olefin sheet to be rendered light transmissive at unmarked portions thereof. In accordance with a second method of the present invention, an ordinary core sheet of plastic is coded with a brush pen and is thereafter laminated to an outer protective transparent envelope.

SPECIFIC DESCRIPTION

In accordance with the preferred method of the present invention a spun olefin fiber sheet which will generally bear ordinary graphic indicia such as height, weight, etc. is marked by virtually any type of writing or printing instrument in a manner to form a code which is typically a series of spaced discrete opaque marks. This inner data-bearing spun olefin fiber sheet is thereafter inserted into a light transmissive envelope generally comprising a pair of transparent plastic sheets which may be readily laminated to the inner data bearing sheet. After insertion, the composite three layer sandwich is introduced into a laminating machine which laminates the layers together by heat and pressure. I have discovered that the spun olefin sheet is readily rendered transparent by the applied heat utilized under standard laminating conditions. Satisfactory samples were produced by utilizing an ordinary spun olefin fibrous sheet manufactured Du Pont which is widely utilized in the fabrication of "throw away" clothing and marketed under the trademark "Tyvek." See also Condensed Chemical Dictionary, copyright 1966, by Reinhold Publishing Company, p. 691. The application of pressure of roughly 25 pounds per square inch at a temperature of roughly 300° Fahrenheit for 3 seconds produced satisfactory samples, although it appears likely that wide variations in these parameters will produce satisfactory results since all that is necessary is to apply a sufficient amount of a physical agent which could be either heat or pressure, or both, to render the spun olefin highly light transmissive in the unmarked portions surrounding the coded indicia. Since, as is well understood, it is desirable to read the coded indicia by passing light through the card, rather than by reflection, providing transparent unmarked code "slots" adjacent highly opaque marks produces highly reliable readout. The use of an ordinary ballpoint pen or a pencil produces satisfactory results. I have demonstrated that it is possible to render the spun olefin sheet transparent by the use of pressure alone, although the application of heat during lamination is particularly preferred owing to convenience. It would of course also be possible to apply the physical agent (heat and/or pressure) to the spun olefin as a separate step before lamination to obtain a good product, although this would be relatively unecessary and inconvenient since heat is applied in any case during lamination. Obviously if materials other than spun olefin become available having similar characteristics they could be utilized in the practice of the present invention. Preferred sheet materials could be selected by merely exposing sheet samples to the usual amount of pressure or heat applied during lamination to determine which become most transparent or are otherwise most satisfactory. Also, unlike paper, an olefin core sheet will not fracture upon being embossed. The term "graphic identification indicia" includes any marking or printed intelligence and is not to be construed as being restricted to a code made up of opaque marks and unmarked spaces. While the term "envelope" as used herein will generally comprise a front and back sheet, at least one of which is light transmissive, one sheet might conceivably suffice to protect the indicia bearing sheet (e.g. protective laquer might be applied to the back of the spun olefin sheet). Aperture cards, data cards or slide transparencies might be fabricated in accordance with the present invention besides the usual type of ID cards bearing the photograph of a subject.

I have also discovered that a printable and transparent inner core sheet consisting of ordinary plastic such as triacetate, cellulose acetate butyrate, polyester terephthalate or polyvinyl chloride may be marked or coded with a brush pen and thereafter laminated to an outer plastic envelope to form a coded data card. However, this approach would generally be impractical for marking codes with ordinary printing inks, ballpoint pens or pencils.

I claim the following:

1. A method for producing a laminated plastic data card comprising the steps of:

applying opaque indicia to a sheet of olefin fiber which becomes transparent upon the application of ordinary heat and pressure employed during the lamination of a plastic data card;

covering said olefin fiber sheet bearing said opaque indicia with a light transmissive cover sheet which may be readily laminated to said olefin fiber sheet; and applying laminating heat and pressure to said olefin fiber sheet and said cover sheet for laminating said cover sheet to said olefin fiber shet and rendering said olefin fiber sheet transparent in portions thereof not bearing said opaque indicia.

References Cited

UNITED STATES PATENTS

| | | | |
|---|---|---|---|
| 2,811,800 | 11/1957 | Gesek | 156—62 |
| 3,253,360 | 5/1966 | Spicer | 40—158 |
| 3,257,484 | 6/1966 | Barnette | 264—47 |
| 3,346,432 | 10/1967 | Magrane | 156—330 |
| 3,389,029 | 6/1968 | Forman et al. | 156—3 |
| 3,411,976 | 11/1968 | Heliker et al. | 161—5 |
| 3,453,165 | 7/1969 | Isbey et al. | 156—235 |
| 3,489,643 | 1/1970 | Hoffman | 162—146 |

FOREIGN PATENTS

| | | | |
|---|---|---|---|
| 851,604 | 10/1960 | Great Britain | 235—61.12 |

OTHER REFERENCES

Raff et al.: "Crystalline Olefin Polymers" (Part II), pp. 221–223, Interscience Publishers (1964), New York.

Lindenmeyer: "Supramolecular Structure in Fibers" (Journal of Polymer Science, Part C, Polymer Symposia), pp. 253, 254 and 274–278, John Wiley & Sons, Inc. (1967), New York.

CARL D. QUARFORTH, Primary Examiner

E. A. MILLER, Assistant Examiner

U.S. Cl. X.R.

156—62, 277, 309; 161—6, 409; 235—61.12